Aug. 20, 1963  L. M. HAGEN ETAL  3,101,257
PREPARATION OF HIGH PURITY SILICON BY DECOMPOSITION OF
SILICON NITRIDE POWDER HAVING A GRAPHITE
TARGET BURIED THEREIN
Filed Aug. 17, 1959  2 Sheets-Sheet 1
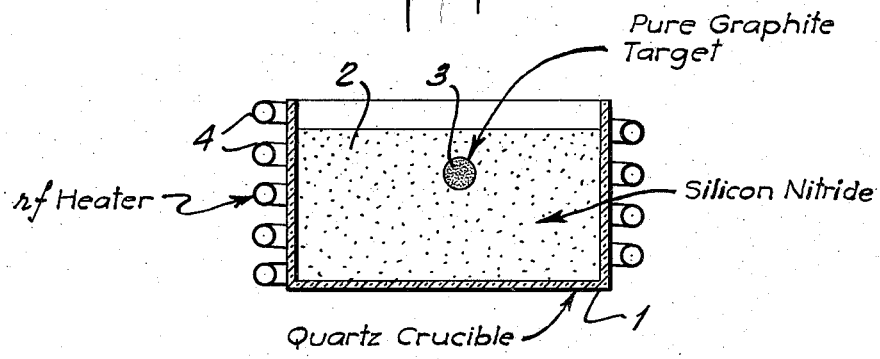
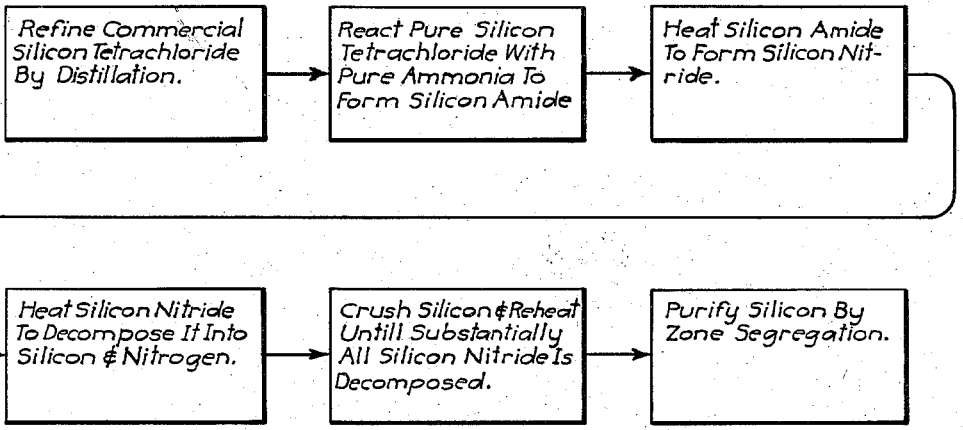
INVENTORS:
LAWRENCE M. HAGEN
WALTER F. LEVERTON
BY
ATTORNEYS.

Fig. 3.

Opaque Quartz Heat Shield
r.f Work Coil
Graphite Tube
Clear Quartz Envelope

INVENTORS:
LAWRENCE M. HAGEN
WALTER F. LEVERTON
BY
Max A. Farmer
ATTORNEYS:

3,101,257
PREPARATION OF HIGH PURITY SILICON BY DECOMPOSITION OF SILICON NITRIDE POWDER HAVING A GRAPHITE TARGET BURIED THEREIN

Lawrence M. Hagen, Nashua, N.H., and Walter F. Leverton, Weston, Mass., assignors, by mesne assignments, to the United States of America as represented by the Secretary of the Navy
Filed Aug. 17, 1959, Ser. No. 834,361
4 Claims. (Cl. 23—223.5)

This invention relates to the preparation of a high purity crystalline silicon of semiconductor grade, and particularly to an improved method and apparatus for obtaining such high purity silicon, employing the thermal decomposition of high purity silicon nitride.

An object of this invention is to provide an improved and relatively simple, practical, effective and inexpensive apparatus and method for producing such silicon of semiconductor grade.

Other objects and advantages will be apparent from the following description of an example of the invention and the novel features will be particularly pointed out hereinafter in connection with the appended claims.

In the accompanying drawings:

FIG. 1 is a schematic sectional elevational view of a crucible inductively heated and containing sulphur nitride which is thermally decomposed in accordance with this invention;

FIG. 2 is a schematic diagram illustrating a sequence of steps employed in accordance with this invention; and FIG. 3 is a schematic diagram illustrating in cross-section apparatus that may be employed for the multiple zone refining of the silicon in accordance with this invention.

Referring first to FIG. 2, this invention comprises, as the first step of the method, the refining of commercial silicon tetrachloride by distillation. This purified product so obtained, is then reacted with pure ammonia to produce a compound of silicon, nitrogen, and hydrogen, i.e., silicon amide, which represents the second step in the method. Silicon amide so obtained, is then heated to form silicon nitride, which is the third step in the method. The silicon nitride so obtained is then heated to cause thermal decomposition of the silicon nitride into silicon and nitrogen, and since the nitrogen is a gas and escapes, it leaves only silicon. Usually all of the silicon nitride is not decomposed in this manner, and therefore the silicon product obtained by the thermal decomposition of the amide is crushed and reheated for further decomposition, with the crushing and reheating continued until substantially all of the silicon nitride has been decomposed in this manner. The resulting silicon so obtained, is then purified by zone segregation.

Using relatively impure commercial nitride it has been found that the decomposition rate is rapid at temperatures that are easily obtained using R.F. induction heating. For example, several grams of commercial silicon nitride can be decomposed in about 5 minutes at a temperature of approximately 1600° C.

The conversion of silicon nitride to silicon metal may be obtained, for example, by thermo decomposition in the following manner:

Silicon nitride powder is placed in a quartz crucible with a spherical graphite target such as about ½" in diameter buried in the center of the nitride ⅟₁₆" below the surface. This graphite target is then heated by induction to temperatures varying from about 1600° C. to 1700° C., which reduces the silicon nitride to a mixture which is about 50% silicon nitride and 50% silicon. This mixture of silicon and silicon nitride is then crushed and then reheated repeatedly for several times until substantially all the silicon nitride has been decomposed into silicon metal and nitrogen.

This heating of the silicon nitride in the quartz crystal with the graphite target buried therein is illustrated in FIG. 1, in which the quartz crucible 1 contains a quantity 2 of silicon nitride, and buried in this silicon nitride powder is the pure graphite target 3. The induction heating coil 4 encircles the crucible and the energy created by the induction coil 4 is taken up by the graphite target and converted into heat which heats the surrounding powder and decomposes it into silicon metal and nitrogen.

In order to employ the crystalline metal so obtained as a semi-conductor, it is advantageous to purify it and this purification is preferably obtained by what is known as multi-zone purification or refining, and apparatus suitable for that purpose is illustrated schematically in FIG. 3. The doping impurities, with the possible exception of boron, could, in principle, be removed rather efficiently from silicon by a multiple-zone segregation which has been used commercially for refining germanium. Early attempts to zone refine silicon failed because molten silicon wet the crucible which was usually formed of quartz and caused it to crack during the cooling cycle between molten zones.

According to the present invention, the cracking of the crucible has been greatly reduced or eliminated by maintaining the regions between the molten zones at relatively high temperatures, and apparatus such as illustrated in FIG. 3 schematically, is useful for this purpose. The crucible 5, FIG. 3, is fabricated from clear quartz and has a wall thickness from about 1 to 2 mm., and can, for example, be about 45 cm. long, and of semicircular cross section approximately 2 cm. in diameter. This crucible 5 is elongated and placed in a horizontal position with its open face uppermost. It is then placed within and is supported by a high-purity graphite tube 6, which is open at both ends, and is about 55 cm. long, 3.5 cm. outside diameter, and about 5 mm. wall thickness. This graphite tube, which serves as an R.F. heater, is surrounded by a heat shield 7 formed of opaque quartz tube of about 60 cm. long, 5 cm. outside diameter, and about 5 mm. wall thickness. The graphite heater 6 and the heat shield 7 are both provided with slots 8 and 9, respectively, along the top for substantially their entire length so as to permit visibility of the silicon in the ingot 10 in the crucible. This assembly is placed in a clear quartz tube or envelope 11 which forms the complete enclosure for the heat shield, graphite tube, quartz crucible and the ingot of silicon, and it has an inlet 12 and an outlet 13 in an end wall thereof, so that an inert gas such as pure argon or helium may be circulated through the envelope to flush out the air and replace it with the inert gas. This flushing may be continuous or it may be discontinued after all the air has been removed from the envelope or enclosure.

An R.F. work coil 14 having a plurality of heating portions spaced apart along the length of the envelope provides an equal number of heating zones that by induction heat the graphite tube and through it the crucible and zones of the silicon ingot. This work coil is movable over the envelope and as it does so, there are three induction heating zones which move along the envelope and create three spaced apart molten zones in the silicon ingot, and between these molten zones, the ingot is maintained at a temperature greater than about 700° C. As the leading coil leaves the end of the ingot, the entire work coil is moved back exactly the distance between successive zones, and the process is repeated.

This broad principle of zone purification or segregation, as used for germanium, is old and is disclosed in United States Patent No. 2,739,088. The apparatus disclosed in FIG. 3 and described herein for creating these moving molten zones is new, particularly as applied to silicon, and has greatly reduced the damage due to the cracking of the crucible as the crucible cools between the molten zones of the ingot. It is found that the crucible under this manner of use does not break during the usual run, but at the conclusion of the process of refinement, the crucible and ingot may crack during the cooling, but the quartz crucible attached to the ingot may be removed by soaking in hydrofluoric acid. After typical runs with such apparatus it was found that the resulting material was of the p-type, and the variation of resistivity along the length of the pulled crystals indicated that the principle doping impurity was boron. Such apparatus is trouble free in operation, and the progress of the spaced molten zones is visible through the envelope and through the slots 8 and 9, which are aligned with one another above the crucible. It provides a very practical method and means for the removal of doping materials other than boron from silicon. Important features of this apparatus and method are the provision for maintenance of high temperatures throughout the ingot and crucible during the entire run, and the opaque quartz heat shield which permits operation at a reasonable power level.

It will be understood that various changes in the details, materials, steps, and arrangements of parts, which have been herein described and illustrated, in order to explain the nature of the invention, may be made by those skilled in the art within the principle and scope of the invention as expressed in the appended claims.

We claim:

1. The method of preparing high purity silicon of semiconductor grade, which comprises heating by induction a body of silicon nitride powder having a graphite target buried in the interior thereof below the surface, to a temperature between about 1600° C. and about 1700° C., then crushing the product and subjecting the crushed product to the same heating, repeatedly until substantially all of the silicon nitride has been decomposed into silicon.

2. The method according to claim 1, and then purifying the silicon so obtained by zone segregation in the presence of an inert gas.

3. The method of preparing a high purity silicon of semiconductor grade, which comprises subjecting a quantity of silicon nitride powder alternately to thermal decomposition treatments and crushings of the decomposition products, until substantially all of the silicon nitride has been converted into silicon wherein the thermal decomposition is obtained by induction heating of the powder with a target buried therein below the surface, at a temperature between about 1600° C. and 1700° C., said target being of pure graphite.

4. In the manufacture of a silicon semi-conductor, the method according to claim 1, and then zone segregating the product by induction heating such product in an inert atmosphere, in a transverse zone and progressively moving said zone from one end of the product to the other.

References Cited in the file of this patent

UNITED STATES PATENTS

| | | |
|---|---|---|
| 2,739,088 | Pfann | Mar. 20, 1956 |
| 2,750,268 | Erasmus et al. | June 12, 1956 |
| 2,773,745 | Butler et al. | Dec. 11, 1956 |
| 2,805,133 | Olson | Sept. 3, 1957 |
| 2,897,329 | Matare | July 28, 1959 |
| 2,904,404 | Ellis | Sept. 15, 1959 |
| 2,905,798 | Freutel | Sept. 22, 1959 |
| 2,926,075 | Pfann | Feb. 23, 1960 |

OTHER REFERENCES

J. Amer. Chem. Soc., 1930, vol. 52, pages 48–52.